United States Patent [19]

Junkermann et al.

[11] 3,715,332
[45] Feb. 6, 1973

[54] RUBBER STOCK COMPOSITION FOR BONDING TO TEXTILE REINFORCEMENT CONTAINING A PHENOL-FORMALDEHYDE PRECURSOR WHEREIN THE FORMALDEHYDE PRECURSOR CONSISTS OF A LINEAR POLYOXYMETHYLENE

[75] Inventors: Helmut Junkermann, Frankfurt; Erhard Klotzer, Hanau, both of Germany

[73] Assignee: Deutsche Gold-und Silber-Scheideanstalt vormals Roessler, Frankfurt am Main, Germany

[22] Filed: Oct. 30, 1970

[21] Appl. No.: 85,773

[52] U.S. Cl............260/41.5 R, 260/41.5 S, 260/838, 260/845, 260/847
[51] Int. Cl..........................C08d 9/10, C08d 13/16
[58] Field of Search..........260/845, 846, 847, 41.5 S, 260/38, 39 SB, 838

[56] References Cited

UNITED STATES PATENTS

| 3,525,703 | 8/1970 | Iwami et al. | 260/5 |
| 3,382,293 | 4/1968 | Price | 260/838 |
| 3,255,274 | 6/1966 | Turick et al. | 260/845 |

FOREIGN PATENTS OR APPLICATIONS 1,078,320   4/1960   Germany

OTHER PUBLICATIONS

Soviet Rubber Technology NRI, Vol. 25, Jan. 1966, Shchichko, pp. 18–21.

*Primary Examiner*—Morris Liebman
*Assistant Examiner*—Richard Zaitlen
*Attorney*—Michael S. Striker

[57] ABSTRACT

A vulcanizable rubber stock composition adapted for firm bonding to a textile reinforcement during vulcanization comprises a natural or synthetic rubber compound, a filler, a phenol or amine and a formaldehyde precursor suited to form a resin with the phenol or amine during vulcanization and consisting of a linear polyoxymethylene of the formula $$HO \cdot (CH_2O)_n \cdot H$$

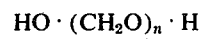

wherein $n$ indicates the average degree of condensation (chain length of the formaldehyde units) and is between 100 and 1,000.

The linear polyoxymethylenes are formed by subjecting paraformaldehyde of an average chain length in excess of 30 and up to 100 or, if below 30, a mixture of formaldehyde with a finely ground solid acid to tempering at an elevated temperature.

15 Claims, No Drawings

RUBBER STOCK COMPOSITION FOR BONDING TO TEXTILE REINFORCEMENT CONTAINING A PHENOL-FORMALDEHYDE PRECURSOR WHEREIN THE FORMALDEHYDE PRECURSOR CONSISTS OF A LINEAR POLYOXYMETHYLENE

BACKGROUND OF THE INVENTION

The present invention relates to a vulcanizable rubber stock composition which is eminently suited for forming a firm bond with a textile reinforcement.

Rubber articles which must undergo substantial dynamic stress, such as vehicle tires, conveyor belts and transmission belts, are usually reinforced with textiles in cord or fabric thread form. The important point with these products is that the rubber must be firmly bonded to the reinforcing textile material no matter whether the latter is a natural fabric or is made of synthetic fibers such as polyesters or polyamides.

Normally, the textile is specially prepared for this purpose by means of a rubber latex or by means of a preformed phenolformaldehyde condensation product in which latter case the phenol usually is employed in the form of resorcinol. The resin component then enters a reaction on the one hand with the functional groups present on the particular textile material, and, on the other hand, with the elastomer, and thus effects a firm bond between the textile and the applied rubber layer.

If the elastomer, be it natural or synthetic rubber, is reinforced as customary with carbon black as filler, and if the resin-forming mixture consists of resorcinol and hexamethylenetetramine, the latter forming the formaldehyde donor, the effect is that the resin formation takes place during the vulcanization and thus causes the bonding of the vulcanizate to the specially prepared or unprepared textile. The increased requirements of the industry regarding such compound products demand a particularly firm bonding of the elastomer to the textile in order to prevent, in case of a high dynamic stress, the filled elastomer and the textile from coming apart.

According to a known procedure, an improvement of the bond of natural or synthetic elastomers to specially prepared or unprepared textiles can be effected by use of condensation products of phenols or amines and aldehydes adapted for resin formation by using an elastomer mixture in which, as filler, activated silicic acid in amounts from 10 to 100 wt.-parts relative to 100 wt.-parts of elastomer has been incorporated, either as such or in mixture with carbon black. The activated silicic acid in this case may be precipitated from water glass by means of acid so as to be in a finely dispersed amorphous form, or it may be a thermally produced silicic acid which is directly formed as a finely dispersed powder with a specific BET surface between 30 and 400 m²/g and an average particle size between 10 and 400 microns. By reaction of the resin components with the functional groups of the textile material, of the elastomer, and of the filler, a substantial increase of the bonding values is obtained.

Optimum properties can be obtained if the resin is formed of resorcinol and formaldehyde. By grinding equal parts of resorcinol and finely distributed silicic acid or adsorptive application of a solution of the resin-forming component to the silicic acid, the difficulty of the poor dispersibility of the resorcinol can be avoided. The formaldehyde component or formaldehyde precursor is usually in the form of a superfine grind of hexamethylenetetramine which develops the formaldehyde necessary for the resin formation with the resorcinol during the vulcanization at the temperatures then applied.

While this system is quite effective, particularly with natural rubber and also with various synthetic elastomers, the inventors have found that with hexamethylene tetramine optimum values cannot be obtained for some desired rubber formulation. Another shortcoming is the injurious action on the fibers of polyester materials caused by the decomposition of the hexamethylenetetramine and the thus generated amine or ammonia.

It is, therefore, an object of the present invention to develop a vulcanizable mixture which can be used with any kind of rubber mixture and wherein the formaldehyde is generated only during the vulcanization but which avoids the use of hexamethylenetetramine.

Normal paraformaldehyde, which is disclosed in Canadian Pat. No. 561,686 as the formaldehyde donor, is not useful for this purpose since it depolymerizes during the mixing process of the components of the elastomer mixture due to the existing elevated temperatures. It therefore leads to a strong formaldehyde generation and thus to an undesirable premature resin formation prior to the vulcanization. A firm bond between the elastomer mixture and the reinforcement material is thus no longer possible.

SUMMARY OF THE INVENTION

The invention comprises a vulcanizable rubber stock composition which includes a natural or synthetic rubber compound, or mixture of such compounds, a filler, a phenol or amine or mixture of the latter two components, and a precursor of formaldehyde, the phenol or amine and formaldehyde precursor being adapted to form a resin during vulcanization. The formaldehyde precursor of the invention consists of linear polyoxymethylenes of the formula $$H \cdot (CH_2O)_n \cdot H$$

wherein $n$ indicates the average degree of condensation (chain length of formaldehyde units) and is between 100 and 1,000.

The invention also embraces a process for making the rubber stock composition wherein the linear polyoxymethylene is obtained by subjecting a paraformaldehyde of an average chain length in excess of 30 and up to 100 to tempering at temperatures between 60° C. and 100° C. for a time of 1 to 4 days when atmospheric pressure is used, and 2 to 3 hours when a partial vacuum is used. The thus-obtained polyoxymethylene is then mixed with the other components to form the vulcanizable rubber mixture.

If a paraformaldehyde with an average chain length below 30 is used, it must be treated with a finely ground solid acid such as oxalic acid prior to the tempering process.

The invention also embraces the process of forming a composite textile reinforcement-rubber product wherein a vulcanizable rubber stock composition as indicated is adhered to the textile reinforcement during vulcanization of the rubber mixture.

DETAILED DESCRIPTION OF THE INVENTION AND OF PREFERRED EMBODIMENTS

The surprising discovery of the present invention is that linear polyoxymethylenes which have an average molecular weight at least corresponding to that of the α-polyoxymethylenes, but which preferably is in excess thereof, are highly useful as formaldehyde donors or precursors for the purposes of the invention.

The α-polyoxymethylenes according to Staudinger are mixtures of linear polyoxymethylene glycols of the type $$H \cdot (CH_2O)_n \cdot H$$

wherein $n$ has the meaning indicated above and is not below 100 and preferably considerably higher, e.g., of the magnitude of in excess of 200.

The general range for n is between 100 and 1000 and preferably between 200 and 500.

The formaldehyde precursors or donors which in the following description will be identified as FOD can be formed in a comparatively simple manner by for instance tempering for 3 days of pulverulent paraformaldehyde of the formula $$H \cdot (CH_2O)_n \cdot H$$

at about 800° C., the average chain length of $n$ being between 30 and 100. Generally, the temperature range should be between 60° C. and 100° C. and the time of treatment should be between 1 and 4 days if normal pressure is applied, and between 2 and 3 hours if a partial vacuum is used.

The paraformaldehyde is formed by condensation of an aqueous formaldehyde solution with addition of a small amount of acid. Usually, the acid is present as a very minor amount of formic acid.

Surprisingly, no useful FOD having the desired properties can be obtained ordinarily by tempering of pulverulent N-paraformaldehyde which has an average chain length $n$ below 30 and particularly between 10 and 20. However, such short-chain-length puleverulent paraformaldehyde can be employed if the paraformaldehyde is first mixed with a finally ground acid, preferably oxalic acid, in amounts between 0.1 and 5 percent of the total mixture and preferably in an amount of 0.5 percent so as to form a homogeneous mixture which is then tempered, for instance for 20–24 hours at 100° C., or, if a partial vacuum is used, for a time of about 2 hours at 80°–90° C. This method of forming the polyoxymethylene is therefore particularly simple and can be carried out most rapidly.

In making the FOD the paraformaldehyde may be first treated with a highly diluted sulfuric acid or sodium hydroxide at room temperature in order to eliminate all low-molecular fractions which may still be present. The mass is then filtered and the residue is washed with water under the same conditions prior to tempering.

The usefulness of the FOD which is obtained in this manner can be tested by determining when the product no longer has any substantial reaction in the so-called "resorcinol test" as it is described in U.S. Pat. Nos. 2,481,981 and 2,519,550.

As the following examples show, the use of the described FOD as distinguished from hexamethylenetetramine permits to process SBR mixtures which have been cross-linked by peroxides, "Hypalon" rubbers (chlorosulfinated polyethylene), ethylene-propylene-diene terpolymers (containing unconjugated dienes) as well as chloroprene rubbers and to obtain excellent bonds by adhering the rubber to polyester fabrics and polyester nylon mixed fabrics.

The compositions may be made to either adding the activated silicic acid and resorcinol to the rubber mixture separately and then mixing the total composition in a kneader or, on the other hand, a premix may be formed of the resorcinol and activated silicic acid which then is mixed with the rubber compound on a roller while further activated silicic acid is added until the necessary amount of filler has been reached.

As already indicated, it is also possible to apply the resorcinol dissolved in a suitable solvent, such as toluene, directly to the silicic acid as the carrier material. The phenol derivative in this case is bound to the carrier material by way of adsorption. The material is then dried and the solvent recovered. The coated silicic acid is then added in form of a powder to the rubber mixture on a roller or in a kneader.

The second resin component, the FOD material, can be added in the same manner as the resorcinol, in order to obtain a better distribution and more convenient mixing with the rubber composition, by grinding it with the activated silicic acid or applying it in solution by way of absorption to the silicic acid. The addition to the rubber compound is then effected after forming the premix of the resin-forming components and the silicic acid, but additional amounts of silicic acid and, if desired, carbon black may be added to the rubber mixture as additional fillers.

The adhesion to the textiles in this case is improved by the intimate contact of the silanol groups which are present on the surface of the silicic acid with the functional groups of the elastomer.

As activated silicic acid it is possible to use silicic acid which has been precipitated from a water glass solution by means of a mineral acid in a finely distributed amorphous form. Otherwise a silicic acid may be used which is directly obtained as a finely dispersed powder by a thermal process and which has a specific surface (BET) of 30–400 m²/g and an average primary particle size between 10 and 40 millimicrons.

Relative to 100 parts of rubber, there are preferably present 7 to 5 parts by weight of resorcinol, 0.5 to 3 parts of FOD, 10 to 100 parts of filler, preferably silicic acid or silicic acid plus carbon black.

The carbon black in the latter case may be present in an amount e.g., of 30 parts by weight for about 12 parts by weight of silicic acid.

The product identified in the following examples as Cofill 11 is a pre-prepared mixture of resorcinol and silicic acid containing 50 percent of resorcinol.

The product identified as FOD is a paraformaldehyde of an original chain length of 10–20 which has been subjected to tempering at a temperature of 80° C. for a time of 1 to 4 days after pretreatment with sulfuric acid as described above. The preferred temperatures for the vulcanization are between 150° C. and 160° C., and the duration of the vulcanization is between 20 and 30 minutes.

The amounts used of zinc oxide may be between 2 and 20 parts, the amounts of sulfur between 1 and 6 parts, and the amounts of softener may be between 2 and 20 parts by weight relative to 100 parts of rubber.

Any desired rubber mixture may be used including mixtures between natural rubber and synthetic elastomer.

The following examples will further illustrate the invention.

EXAMPLE 1

Styrene-butadiene/natural Rubber Blend 75/25

|  | Mixture 1 with hexamethylene-tetramine | Mixture 2 with FOD |
|---|---|---|
| styrene-butadiene copolymerizate (SBR 1502) | 75 | 75 |
| natural rubber | 25 | 25 |
| phenyl-β-naphthylamine | 1 | 1 |
| activated carbon black | 30 | 30 |
| active silicic acid | 12.5 | 12.5 |
| highly aromatic softener (Dutrex — aromatic hydrocarbons) | 7 | 7 |
| zinc oxide | 10 | 10 |
| sulfur | 2.3 | 2.3 |
| sulfenamide accelerator | 1.4 | 1.4 |
| Cofill 11 | 6 | 6 |
| hexamethylenetetramine | 1.5 | |
| FOD | | 1.5 |
| diphenylguanidine | | 0.4 |
| vulcanization 30 min/150° C. bond (kp/2.5 cm) | | |
| with polyamide } no special | 18.5 | 22 |
| with polyester } preparation | 12 | 16 |

EXAMPLE 2

Chlorsulfonated Polyethylene

|  | Mixture 1 with hexamethylene-tetramine | Mixture 2 with FOD |
|---|---|---|
| chlorosulfinated polyethylene | 100 | 100 |
| activated carbon black | 30 | 30 |
| active silicic acid | 12 | 12 |
| naphtenic softener (Circoskol) cyclic hydrocarbons) | 10 | 10 |
| magnesia usta | 10 | 10 |
| PbO | 10 | 10 |
| anti-aging agent: phenyl- SS-naphthylamine (PBN) | 2 | 2 |
| dibenzothiazyldisulfide | 0.5 | 0.5 |
| dipentylmethylenethiuram tetrasulfide | 0.75 | 0.75 |
| Cofill 11 | 6 | 6 |
| hexamethylenetetramine | 1.5 | |
| FOD | | 1.5 |
| vulcanization 20 min/160° C. bond (kp/2.5 cm) | | |
| with polyamide } no special | 1.5 | 13 |
| with polyester } preparation | 4 | 14 |

EXAMPLE 3

Chloroprene Elastomer

|  | Mixture 1 with hexamethylene tetramine | Mixture 2 with FOD |
|---|---|---|
| chloroprene elastomer | 100 | 100 |
| stearic acid | 2.5 | 2.5 |
| magnesia usta | 4 | 4 |
| zinc oxide | 5 | 5 |
| anti-aging agent | 1 | 1 |
| activated silicic acid | 18.5 | 18.5 |
| kaolin m | 30 | 30 |
| tricresylphosphate | 10 | 10 |
| naphthenic softener | 10 | 10 |
| Cofill 11 | 3 | 3 |
| sulfur | 1 | 1 |
| tetramethylthiuram disulfide | 0.6 | 0.7 |
| hexamethylenetetramine | 1.5 | |
| FOD | | 1.5 |
| Vulcanization 20 min/150° C. bond (kp/2.5 cm) | | |
| with polyamide } no special | 24 | 35 |
| with polyester } preparation | 39 | 37 |

EXAMPLE 4

Ethylene-Propylene-Diene-Terpolymer

|  | Mixture 1 with hexamethylene tetramine | Mixture 2 with FOD |
|---|---|---|
| ethylene-propylene-diene terpolymer (Nordel of the DuPont Company) | 100 | 100 |
| activated silicic acid | 15 | 15 |
| activated carbon black | 25 | 25 |
| naphthenic acid softener | 5 | 5 |
| stearic acid | 3 | 3 |
| zinc oxide | 5 | 5 |
| Cofill 11 | 6 | 6 |
| tetramethylthiuramidisulfide | 1.7 | 1.7 |
| mercaptobenzothiazol | 1 | 1 |
| sulfur | 1.6 | 1.6 |
| hexamethylenetetramine | 1.5 | |
| FOD | | 1.5 |
| vulcanization 30 min/160° C. bond (kp/2.5 cm) | | |
| with polyamide } no special | 15 | 20 |
| with polyester } preparation | 13 | 28 |

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A vulcanizable rubber stock composition adapted for forming a firm bond with a textile reinforcement, the said rubber composition comprising a natural or synthetic rubber compound or blend of such compounds, a filler, a phenol and a precursor of formaldehyde, the said phenol and formaldehyde precursor adapted to form a resin during vulcanization, and the formaldehyde precursor consisting of a linear polyoxymethylene of the formula $$HO \cdot (CH_2O)_n \cdot H$$

wherein $n$ indicates the average degree of condensation and is between 100 and 1,000, the amounts of the several components relative to 100 parts of said rubber compound or blend being as follows: 1 to 5 parts of phenol, 0.5 to 3 parts of formaldehyde precursor and 10 to 100 parts of filler.

2. The composition of claim 1, wherein $n$ is between 200 and 500.

3. The composition of claim 1, wherein the filler is activated silicic acid.

4. The composition of claim 1, wherein the filler is activated silicic acid together with carbon black.

5. The composition of claim 1, wherein the rubber is a styrene-butadiene, a chlorosulfonated polyethylene, an ethylene-propylene-diene terpolymer, or a chloroprene synthetic elastomer.

6. The process of making the rubber stock composition of claim 1, comprising subjecting a paraformaldehyde of an average chain length in excess of 30 and up to 100 to tempering at a temperature between 60° C. and 100° C. for a time of 1 to 4 days if employing atmospheric pressure, and for a time between 2 and 3 hours if employing a partial vacuum, and mixing the thus-obtained linear polyoxymethylene having the formula defined in claim 1 with a rubber compound, a filler and the said phenol suited, together with the formaldehyde, to form the said rubber stock composition.

7. The process of claim 6, wherein the phenol is resorcinol and the filler is activated silicic acid and wherein a premix is first formed of at least part of the silicic acid with the resorcinol or of these two components and the formaldehyde precursor, whereupon the premix is intimately mixed with the remaining components of the rubber stock composition.

8. The process of claim 7, wherein solid silicic acid, resorcinol and formaldehyde precursor are ground together to form the said premix.

9. The process of claim 7, wherein the resorcinol and formaldehyde precursor are applied in the form of a solution to the silicic acid to adhere thereto by adsorption whereupon the thus-formed mass is united with the remaining components by intimate mixture.

10. The process of claim 6 wherein the paraformaldehyde is first treated with dilute $H_2SO_4$ or NaOH whereupon it is filtered and the filter residue then is subjected to said tempering treatment.

11. The process of making the rubber stock composition of claim 1, comprising mixing a paraformaldehyde of an average chain length below 30 with finely ground solid acid in an amount of 0.1 to 5 percent of the mixture thus formed and then subjecting the paraformaldehyde to tempering at a temperature between 60° C. and 100° C. for a time between 1 and 4 days if atmospheric pressure is used and for a time between 2 and 3 hours if a partial vacuum is used and mixing the thus-obtained linear polyoxymethylene having the formula defined in claim 1 with a rubber compound, a filler and a phenol suited together with the formaldehyde to form a resin during vulcanization.

12. The process of claim 11 wherein the said acid is oxalic acid.

13. The process of claim 11 wherein the amount of said acid is 0.5 percent.

14. The process of claim 11 wherein the tempering is effected at a temperature of about 100° C. for a time between 20 and 24 hours.

15. The process of forming a composite textile reinforced rubber product, wherein a natural or synthetic rubber mixture is firmly bonded to a textile, the said process comprising the steps of intimately mixing with the rubber or rubber mixture (a) a finely divided activated filler in an amount of 10 to 100 parts of filler by weight per 100 parts of rubber and (b) a minor proportion of a combination of components adapted to form a resin during subsequent vulcanization of the rubber, the said combination of components comprising a phenol and a formaldehyde precursor and the said formaldehyde precursor consisting of a linear polyoxymethylene of the formula $$HO \cdot (CH_2O)_n \cdot H$$

wherein $n$ indicates the average degree of condensation and is between 100 and 1,000; and then vulcanizing the thus-modified rubber mixture onto the textile reinforcement.

* * * * *